(12) United States Patent
Kim

(10) Patent No.: US 10,324,307 B2
(45) Date of Patent: Jun. 18, 2019

(54) IMAGE CAPTURING OPTICAL SYSTEM

(71) Applicant: Samsung Electronics Co., Ltd., Gyeonggi-do (KR)

(72) Inventor: Dong-Woo Kim, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 151 days.

(21) Appl. No.: 15/255,273

(22) Filed: Sep. 2, 2016

(65) Prior Publication Data
US 2017/0068108 A1 Mar. 9, 2017

(30) Foreign Application Priority Data
Sep. 4, 2015 (KR) .......... 10-2015-0125863

(51) Int. Cl.
G02B 27/64 (2006.01)
G02B 13/00 (2006.01)
G02B 15/173 (2006.01)
G03B 5/02 (2006.01)
G03B 3/10 (2006.01)
G02B 9/34 (2006.01)

(52) U.S. Cl.
CPC ......... G02B 27/646 (2013.01); G02B 13/002 (2013.01); G02B 13/0045 (2013.01); G02B 15/173 (2013.01); G02B 9/34 (2013.01); G03B 3/10 (2013.01); G03B 5/02 (2013.01); G03B 2205/0015 (2013.01)

(58) Field of Classification Search
CPC .......... G02B 27/646; G02B 13/002; G02B 13/0045; G02B 15/173; G02B 9/34; G03B 3/10; G03B 5/02; G03B 2205/0015
USPC .......... 359/557
See application file for complete search history.

(56) References Cited

U.S. PATENT DOCUMENTS 5,719,703 A * 2/1998 Sato .......... G02B 13/02 359/554
2014/0104708 A1 4/2014 Onozaki
2015/0092100 A1* 4/2015 Chen .......... H04N 5/23212 348/349

FOREIGN PATENT DOCUMENTS

JP 2013-33178 A 2/2013
JP 2014-81457 A 5/2014
JP 2015-41012 A 3/2015

* cited by examiner

Primary Examiner — Wen Huang
(74) Attorney, Agent, or Firm — Cha + Reiter, LLC.

(57) ABSTRACT

According to an embodiment of the present disclosure, an image capturing optical system includes a first lens group having a positive refractive power and disposed along an optical axis and to face an object. A second lens group has a negative refractive power and disposed along the optical axis and adjacent to the first lens group, and second lens group includes a focus correction lens to correct a difference in a focused position according to a variation in a position of the object. A third lens group has a positive refractive power and disposed along the optical axis. A subsequent lens group adjacent the third lens group and disposed along the optical axis and to face an image of the object, and the lens group subsequent to the second lens group includes a camera shake correction lens to move in a direction perpendicular to the optical axis.

10 Claims, 9 Drawing Sheets

IMAGE CAPTURING OPTICAL SYSTEM

CLAIM OF PRIORITY

This application claims the benefit of priority under 35 U.S.C. § 119(a) to Korean Application Serial No. 10-2015-0125863, which was filed in the Korean Intellectual Property Office on Sep. 4, 2015, the entire content of which is incorporated herein by reference in its entirety.

TECHNICAL FIELD

The present disclosure relates to image capturing optical systems.

BACKGROUND

Mobile communication device, PDAs, smartphones, or other mobile communication means may include additional functions which may be more frequently used as well as provide more diversified services. For example, mobile communication devices may include mobile camera modules with convergence devices capable of high-quality video capturing, auto focusing, and quick response (QR) code recognition and the like.

There has been increased attention related to camera technology such as Advanced Photo System type-C (APS-C) or higher interchangeable cameras and lenses.

In some cases, as the size of the camera sensor increases, the lens increases in size and weight, which may cause conditions to occur during image capturing such as AF velocity-related or noise issues upon video capturing, and image blurring or image shake due to the camera shake (or the movement of the camera) and the like.

For example, Japanese Patent Application Publication No. JP2013033178A, titled "OPTICAL SYSTEM, OPTICAL DEVICE, AND METHOD FOR MANUFACTURING OPTICAL SYSTEM," discloses an image capturing optical system having a first lens group having positive refractive power, a second lens group having negative refractive power, and a third lens group having positive refractive power from an object. This image capturing optical system includes three focusing lenses in the second lens group and two optical image stabilizers (hereinafter, "OIS lens") in the third group as a Fno 1.4-level, large-diameter optical system applies. In example, the term "Fno" may refer to Focal length/Entrance Pupil diameter characteristics of an optical system which represents f-number of an optical system that is the ratio of the lens's focal length to the diameter of the entrance pupil.

The image capturing optical system may have a plurality of focusing lenses and a plurality of OIS lenses and require an enlarged focusing actuator and OIS actuator for actuating focusing, which may result in an increase in the overall size of the lens barrel.

Further, Japanese Patent Application Publication No. JP2014081457A, titled "LARGE DIAMETER TELEPHOTO LENS SYSTEM," discloses an image capturing optical system having a first lens group with a positive refractive power, a second lens group with negative refractive power, and a third lens group with positive refractive power from an object. The second lens group in the image capturing optical system includes a lens system, which is a focus lens group moving in a direction of an optical axis. The image capturing optical system uses two focusing lenses when a Fno 1.4-level large-diameter optical system applies. The image capturing optical system includes a plurality of focusing lenses in the second lens group and has an enlarged focusing actuator, causing the overall optical system bulky. Further, the image capturing system may include an OIS-free optical system, which may cause image shake due to a camera shake when capturing video.

Further, Japanese Patent Application Publication No. JP2015041012A titled "INNER FOCUS LENS AND IMAGE CAPTURING DEVICE," discloses a first lens group having positive refractive power, a second group having negative refractive power and a third group having positive refractive power from an object. The optical system disclosed therein has the second lens group configured of a sheet of element and the first lens group and the third lens group fastened on an optical axis, and the optical system has the second lens group move in an upper direction from the object along the optical axis to do focusing from a state of focusing an infinitely distant object up to a state of focusing for a closest distance object. The optical system overall includes seven lenses, and thus, it may be advantageous to implement a compact AF optical system. However, when applied to Fno 1.4 large-diameter optical systems, the configuration may make it difficult to correct chromatic aberration and astigmatism of large-diameter optical systems. Further, it may cause image blur due to camera shake when taking a video because it is an OIS-free optical system.

The above information is presented as background information only to assist with an understanding of the present disclosure. No determination has been made, and no assertion is made, as to whether any of the above might be applicable as prior art with regard to the present disclosure.

SUMMARY

Therefore, according to one or more embodiments of present disclosure, there is provided an improved image capturing optical system. In one example, the optical system may provide high-performance, large-diameter short focus lenses, which may perform image capturing in a standard view angle area at a 46-degree view angle level. In another example, the optical system may be applicable to a camera for interchangeable lenses or a camera having as large a sensor as that of the 35 mm film and may implement quick auto-focusing by configuring itself in a large diameter of Fno 1.4 while including an auto focusing lens (hereinafter, "AF lens"). In another example, the optical system may minimize an image imbalance due to an external variation, such as camera shake, which may occur upon video capturing, by including one OIS lens to enable anti-vibration.

According to an embodiment of the present disclosure, disclosed is an image capturing optical system includes a first lens group having a positive refractive power and disposed along an optical axis and to face an object. A second lens group has a negative refractive power and disposed along the optical axis and adjacent to the first lens group, and second lens group includes a focus correction lens to correct a difference in a focused position according to a variation in a position of the object. A third lens group has a positive refractive power and disposed along the optical axis. A subsequent lens group adjacent the third lens group and disposed along the optical axis and to face an image of the object, and the lens group subsequent to the second lens group includes a camera shake correction lens to move in a direction perpendicular to the optical axis.

In other embodiments, characteristics of the optical system may satisfy an equation "$0.7 \leq f1/f \leq 1.2$" wherein, "f1" represents a lens focal length of the first lens group, and "f"

represents a focal length of the optical system. In another embodiment, a lens provided in the second lens group may satisfy an equation "1.4≤N2≤1.6" wherein, "N2" represents a d-line refractive index of the lens of the second lens group. In another embodiment, a first lens disposed to face the object arranged in the first lens group may be configured as a lens convex upwards. In another embodiment, the first lens group may include at least one or more doublet lenses. In another embodiment, a lens disposed at an uppermost side among lenses arranged in the first lens group may be configured as an aspherical lens. In another embodiment, lenses arranged in the second lens group may include a meniscus lens convex to face the object. In another embodiment, characteristics of the optical system may satisfy an equation "1.5≤f2/f≤1.0" wherein "f2" represents a focal length of a lens of the second lens group, and "f" represents a focal length of the optical system. In another embodiment, lenses arranged in the third lens group may include a meniscus aspheric lens convex to face the object. In another embodiment, the subsequent group to the third lens group may include at least one or more doublet lenses. In another embodiment, the subsequent group to the third lens group may include at least one or more meniscus aspheric lenses.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features, and advantages of the present disclosure will be more apparent from the following detailed description taken in conjunction with the accompanying drawings, in which.

Throughout the drawings, like reference numerals will be understood to refer to like parts, components, and structures.

DETAILED DESCRIPTION

Figure 1:
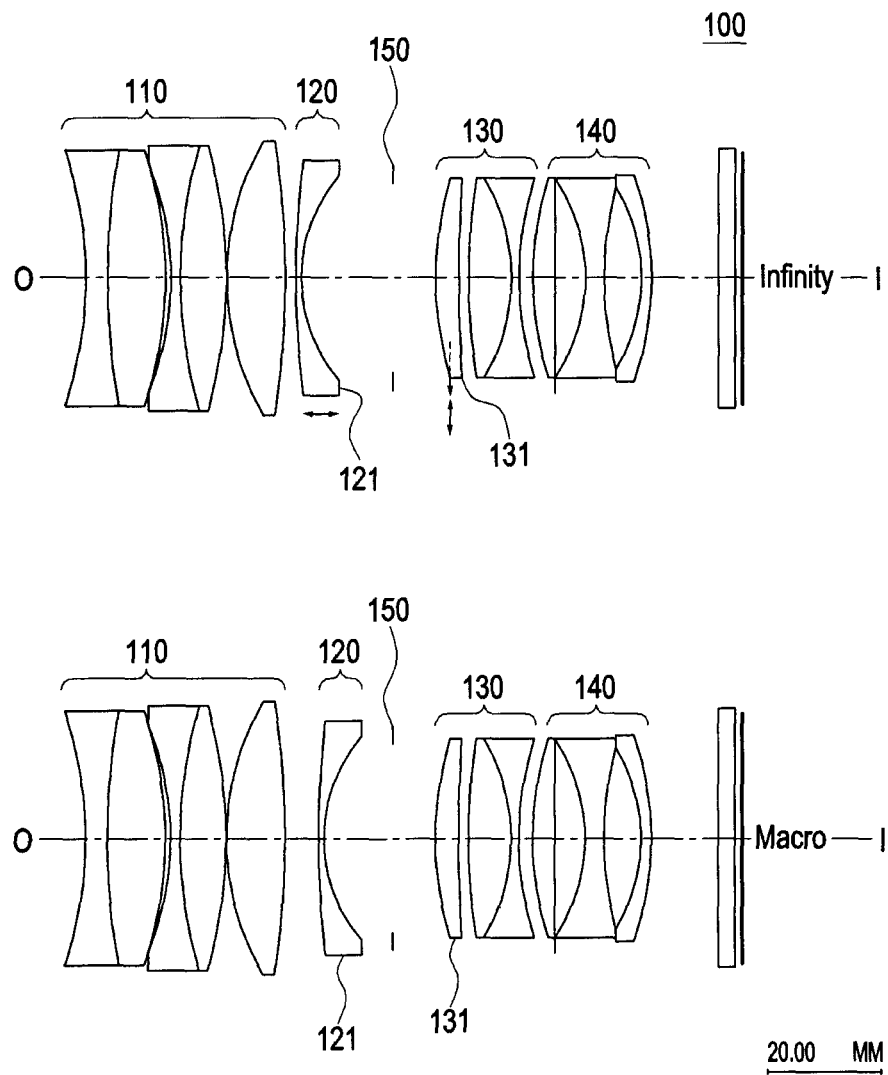
FIG. 1 is a view illustrating a lens arrangement of an image capturing optical system according to an embodiment of the present disclosure.

Hereinafter, one or more embodiments of the present disclosure are described with reference to the accompanying drawings. However, it should be appreciated that the present disclosure is not limited to the embodiments, and all changes and/or equivalents or replacements thereto also belong to the scope of the present disclosure. The same or similar reference denotations may be used to refer to the same or similar elements throughout the specification and the drawings.

As used herein, the terms "have", "may have", "include," or "may include" a feature (e.g., a number, function, operation, or a component such as a part) indicate the existence of the feature and do not exclude the existence of other features. As used herein, the terms "A or B", "at least one of A and/or B", or "one or more of A and/or B" may include all possible combinations of A and B. For example, "A or B", "at least one of A and B" and "at least one of A or B" may indicate all of (1) including at least one A, (2) including at least one B, or (3) including at least one A and at least one B.

As used herein, the terms "first" and "second" may modify various components regardless of importance and/or order and are used to distinguish a component from another without limiting the components. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to" or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for", "having the capacity to", "designed to", "adapted to", "made to" or "capable of" depending on circumstances. The term "configured (or set) to" does not essentially mean "specifically designed in hardware to." Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a", "an", and "the" include plural references unless the context clearly dictates otherwise. The terms including technical and scientific terms used herein have the same meaning as commonly understood by one of ordinary skill in the art related one or more embodiments of the present disclosure. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device. According to an embodiment of the present disclosure, the wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device (e.g., an implantable circuit).

According to an embodiment of the present disclosure, the electronic device may be a home appliance. Examples of a home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present disclosure, examples of the electronic device may be applicable to one or more medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or Internet of Things devices (e.g., a bulb, various sensors, an electric or gas meter, a sprinkler, a fire alarm, a thermostat, a street light, a toaster, fitness equipment, a hot water tank, a heater, or a boiler).

According to one or more embodiments of the disclosure, examples of the electronic device may at least one of part of a piece of furniture or building/structure, an electronic board, an electronic signature receiving device, a projector, or various measurement devices (e.g., devices for measuring water, electricity, gas, or electromagnetic waves). According to an embodiment of the present disclosure, the electronic device may be one or a combination of the above-listed devices. According to an embodiment of the present disclosure, the electronic device may be a flexible electronic device. The electronic device disclosed herein is not limited to the above-listed devices, and may include new electronic devices depending on the development of technology.

Further, according to an embodiment of the present disclosure, details of a technical configuration and operation directed to a problem to be solved in an image capturing optical system may be clearly understood by the following detailed description with reference to the drawings illustrating preferred embodiments of the present disclosure.

It should be understood that parameter "r", the thickness, size, and shape of a lens in a lens configuration diagram of each embodiment may not be illustrated or shown to scale (i.e. slightly exaggerated) for the detailed description of the disclosure. In particular, a spherical or an aspherical shape illustrated in the lens configuration diagram are presented as an example, and the present disclosure is not limited thereto.

FIG. 1 is a view illustrating a lens arrangement of an image capturing optical system 100 according to an embodiment of the present disclosure Referring to FIG. 1, according to one or more embodiments of the present disclosure, the image capturing optical system 100 may include a first lens group 110 having a positive (or plus (+)) refractive power, a second lens group 120 having a negative (or minus (−)) refractive power, a third lens group 130 having a positive refractive power, and a subsequent group to the third lens group 130 in an order thereof from a side of an object.

The first lens group 110 may include a doublet lens having a first positive concave lens and a positive convex lens bonded together, a second doublet lens having a positive concave lens and a positive convex lens bonded together, and a positive convex aspherical lens in an order thereof from a side of an object.

According to an embodiment of the present disclosure, two doublet lenses and an aspherical positive convex lens may be arranged in the first lens group 110. The first lens group 110 may be disposed along an optical axis O-I which is shown as a horizontal dashed line that extends through the optical axis of the first lens group 110 and through second lens group 120, the third lens group 130 and to the fourth lens group 140. The first lens group 110 has a surface or face that faces an object along the optical axis O-I. In addition, the term "object side" or "side of an "object" refers to the first lens group 110 having a surface or face that faces an object along the optical axis O-I. In addition, the term "side of an object" refers to the lens group 140 having a surface or face that faces an image of the object. In one example, the two doublet lenses of the first lens group 110 may correct a sagittal coma aberration and chromatic aberration that may be generated in the large diameter optical system. That is, as the optical system includes the first object-side lens having an object-side surface convex upwards, the object-side surface of the object-side first lens in the first lens group 110 may be provided to be convex upwards, which may allow for the correction of the sagittal coma aberration and minimize the size of the overall optical system. Further, as described above, the first lens group 110 may include at least one or more doublet lenses. Thus, a sagittal coma aberration and chromatic aberration caused in the large-diameter optical system may be corrected efficiently by using at least one or more doublet lenses in the first lens group 110 and properly configuring the power of the lens.

Further, as the aspherical biconvex lens is disposed in the first lens group 110, the spherical aberration correction of the overall optical system may be facilitated, and the lens deposed in the subsequent group of the first lens group may be configured to be smaller in size relative to the first lens group 110. That is, the uppermost lens (i.e. disposed after the two doublet lens away from the object side) in the first lens group 110 may be configured to have aspherical surface, which may allow spherical aberration correction to be advantageously done while allowing the lens in the subsequent group to be smaller in size relative to the first lens group 110.

According to an embodiment of the present disclosure, the second lens group 120 may include a focus correction lens 121 to correct the difference in focus position by the variation in the distance of the object. The focus correction lens 121 may be configured as a meniscus sub-lenses concave upwards of the second lens group 120. As described above, the focus correction lens 121 may be configured as a lens to correct the focus position difference by the object distance variation, and it may be configured as a meniscus lens. In one example, the lens 121 is configured to move in a horizontal direction parallel to the optical axis O-I as shown by horizontal arrows associated with lens 121. The focus correction lens 121 configured as the meniscus lens may use a material having an abbe number of 55 or more, and a d-line refractive index of 1.7 or less, which may result in reduced weight of the lens with a reduced specific gravity as compared to a high refractive index of material and an optimal performance under circumstances requiring high speed AF and a large diameter lens of Fno 1.4. That is, a meniscus lens convex to the side of the object may be configured as the focus correction lens 121 in the second lens group 120 which may minimize the field curvature aberration variation according to the object distance variation and reduce the volume of the lens, advantageously reducing the weight of the focus lens group.

According to an embodiment of the present disclosure, an aperture 150 may be formed or provided between the second lens group 120 and the third lens group 130 of the subsequent groups to the second lens 120. In this case, the distance between the first lens group 110, the second lens group 120, and the aperture may be reduced to the minimum amount which may improve correction of the spherical aberration and astigmatism.

According to an embodiment of the present disclosure, the third lens group 130 may include an anti-shake function, which may efficiently correct an image imbalance due to a vibration of the overall optical system by an external vibration, such as the user's hand movement.

The third lens group 130 may include a camera shake correction lens 131 to provide an anti-shake function. The camera shake correction lens 131 may correct an image imbalance by moving a lens in the third lens group 130 in a direction perpendicular to the optical axis O-I as shown by the vertical arrows associated with the lens 131. According to an embodiment of the present disclosure, the anti-shake camera lens may be provided as a meniscus aspheric positive lens, which is convex to the object side. The convex meniscus aspheric positive lens included in the third lens group 130 may be moved perpendicular to the optical axis O-I, effectively correcting the image imbalance due to the vibration of the overall optical system by an external vibration, such as the user's hand movement. The camera shake correction lens 131 included in the third lens group 130 may be configured to have an aspheric surface to facilitate spherical aberration correction of the overall optical system and minimize a performance degradation due to an aberration variation when correcting the image imbalance. That is, even though a lens may move in a direction perpendicular to the optical axis O-I using one meniscus aspheric lens to correct camera shake, the variation in the spherical aberration and astigmatic may be minimized, which may improve the performance of the optical system when correcting camera shake.

According to an embodiment of the present disclosure, a subsequent group including at least one or more lenses may be provided behind or adjacent the third lens group 130. The subsequent group may be referred to as a fourth lens group 140. The fourth lens group 140 may include one or more doublet lenses. Further, the fourth lens group 140 may include a meniscus aspheric lens. The doublet lens included in the fourth lens group 140 may include a positive lens and a negative lens in such a manner that the respective abbe numbers of the positive lens and negative lens may remain symmetrical, therefore enabling the axial chromatic aberration correction of the overall image capturing optical system 100 as well as the correction of magnification chromatic aberration. Further, the correction of the astigmatism and field curvature aberration may be facilitated by providing a meniscus aspheric lens at the uppermost side of the fourth lens group 140.

Hereinafter, an operation of an image capturing optical system configured as above may be described according to one or more embodiments of the present disclosure as referenced to system 100 labeled "Infinity". As described above, in reference to system 100 labeled "Macro", according to an embodiment of the present disclosure, the image capturing optical system 100 may include a first lens group 110 having a positive refractive power, a second lens group 120 having a negative refractive power, a third lens group 130 having a positive refractive power, and a fourth lens group 140 having a positive refractive power. The second lens group 120 is configured as a focusing lens group which performs an upper surface movement according to an object distance variation and focus position correction along the optical axis O-I. The third lens group 130 has an OIS function to correct an image imbalance due to an external vibration, such as the user's camera shake while moving in a perpendicular direction relative to the optical axis O-I.

The "Infinity" represents a farthest position from a distance scale of the lens, for example, it is called to be apart from the lens infinitely, and the "Macro" represents a capacity to adjust focal length very closely for capturing a small object.

As described above, according to the present disclosure, the image capturing optical system 100 enables aberration correction by the following conditional expressions. The conditional expressions and their effects are described below.

$$0.7 \le f1/f \le 1.2 \qquad \text{[Conditional Expression 1]}$$

where, "f1" represents the lens focal length of the first lens group 110, and "f" represents the lens focal length of the overall optical system.

Conditional Expression 1 is an equation (or expression) indicating the ratio of the focal length of the first lens group 110 to the focal length of the overall optical system. Upon exceeding an upper threshold of Conditional Expression 1, the focal length of the first lens group 110 relative to the full focal length may increase, and thus, the size of the subsequent groups increases, resulting in an increase in the size of overall optical system. Upon exceeding a lower threshold of Conditional Expression 1, it may be advantageously configured in a small barrel, but have difficulty in aberration correction.

$$1.4 \le N2 \le 1.6 \qquad \text{[Conditional Expression 2]}$$

where, "N2" represents the d-line refractive index of the second lens group 120.

Conditional Expression 2 is an equation (or expression) for the d-line refractive index of the lens in the second lens group 120. Upon exceeding an upper threshold of Conditional Expression 2, the specific gravity as compared to a low refractive index material may increase, and thus, the weight of the overall second lens group 120 may increase. Therefore, upon controlling focusing, it may be difficult to reduce the size of the actuator and conduct relatively fast focusing, and the abbe number may be decreased as compared with the low refractive index material, which may make it difficult to perform magnification chromatic aberration correction.

$$-1.5 \leq f2/f \leq -0.8 \quad \text{[Conditional Expression 3]}$$

where, "f2" represents the lens focal length of the second lens group 120, and "f" represents the focal length of the overall optical system.

Conditional Expression 3 may be an equation (or expression) indicating the ratio of the focal length of the second lens group 120 relative to the overall optical system. Upon exceeding an upper threshold of Conditional Expression 3, the focal length of the second lens group 120 relative to the focal length of the overall optical system may shorten, and thus the movement for focusing may be reduced. However, aberration correction may be difficult. Upon exceeding a lower threshold of Conditional Expression 3, the focal length of the second lens group 120 may lengthen, which may result in the movement for focusing being increased, causing the size of the overall optical system to increase.

The image capturing optical system 100 is described below in greater detail using specific values according to an embodiment of the present disclosure.

As described above, the following first to third embodiments may include the first lens group 110 having a positive refractive power, the second lens group 120 having a negative refractive power, the third lens group 130 having a positive refractive power and a subsequent group behind the third lens group 130 in an order thereof from an object side. The second lens group 120 may include a focus correction lens, which corrects the difference in the focused position due to the variation in the position of the object. The subsequent group of the second lens group 120 may include a camera shake correction lens which is configured to move in a direction perpendicular to the optical axis O-I to correct an image imbalance due to an external vibration.

The aspherical surface used in each embodiment below can be obtained from the well-known Equation 1. K is the conic constant, and A, B, C, and D are aspheric constants. E and its subsequent number may represent a power of 10. For example, E+02 may indicate $10^2$, and E-02 may indicate $10^{-2}$.

$$x = \frac{c'y^2}{1+\sqrt{1-(K+1)c'^2 y^2}} + Ay^4 + By^6 + Cy^8 + Dy^{10} \quad \text{[Equation 1]}$$

where x: distance from the vertex of the lens in the coaxial direction
y: distance in the direction perpendicular to the optical axis
c': reciprocal of the radius of the curvature (=1/R)
K, A, B, C, and D: aspheric coefficients

[First Embodiment]

Table 1 below may represent a numerical example according to an embodiment of the present disclosure and may also represent aspheric coefficients of Equation 1 according to the first embodiment.

Figure 2:
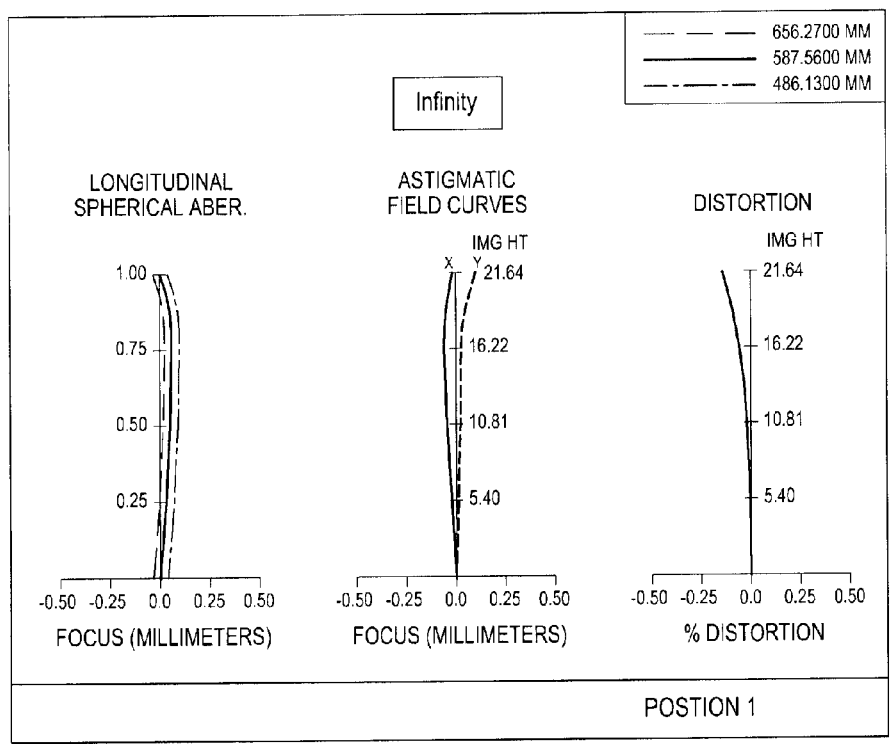
FIG. 2 is a graph illustrating data characteristics of an aberration of the image capturing optical system illustrated in FIG. 1 according to an embodiment of the present disclosure.

Further, FIG. 1 is a view illustrating a lens arrangement in the image capturing optical system according to an embodiment of the present disclosure. FIG. 2 is a view illustrating data characteristics of an aberration of the image capturing optical system 100 illustrated in FIG. 1.

In the case of the first embodiment, it is assumed to illustrate that "f" of the overall optical system is 51.52 mm, Fno is 1.44, and 2ω is 46.92.

TABLE 1

| | Refractive Index (RDY) | Thickness (THI, mm) | Refractive Index (Nd) | Abbe Number (Vd) |
|---|---|---|---|---|
| OBJ: | INFINITY | INFINITY | | |
| 1: | −68.93753 | 4.000000 | 1.772500 | 49.6243 |
| 2: | 144.13824 | 10.000000 | 1.834805 | 42.7218 |
| 3: | −71.04506 | 1.314624 | | |
| 4: | −50.04997 | 1.600000 | 1.688930 | 31.1605 |
| 5: | 86.94965 | 7.885752 | 1.772500 | 49.6243 |
| 6: | −86.94965 | 0.300000 | | |
| 7: | 43.86290 | 10.280185 | 1.689460 | 52.6700 |
| ASP: | | | | |
| K: 0.935742 | | | | |
| A: −0.330460E−05 B: −0.264614E−08 C: −0.127931E−12 | | | | |
| D: 0.000000E+00 | | | | |
| 8: | −138.53557 | D1 | | |
| ASP: | | | | |
| K: 5.945957 | | | | |
| A: 0.747502E−06 B: −0.122288E−08 C: 0.191218E−11 | | | | |
| D: 0.000000E+00 | | | | |
| 9: | 159.89709 | 1.000000 | 1.487489 | 70.4412 |
| 10: | 26.60756 | D2 | | |
| STO: | INFINITY | 7.654826 | | |
| 12: | 55.47426 | 4.000000 | 1.689460 | 52.6700 |
| ASP: | | | | |
| K: −4.400439 | | | | |
| A: 0.265859E−05 B: 0.462499E−09 C: −0.460508E−11 | | | | |
| D: 0.000000E+00 | | | | |
| 13: | 207.85827 | 1.934480 | | |
| 14: | 102.14581 | 7.599868 | 1.910822 | 35.2500 |
| 15: | −33.38551 | 1.600000 | 1.698950 | 30.0505 |
| 16: | 51.03699 | 2.368515 | | |
| 17: | 71.63347 | 9.415403 | 1.804200 | 46.5025 |
| 18: | −28.00000 | 3.051998 | 1.647690 | 33.8406 |
| 19: | 62.32409 | 6.698506 | | |
| 20: | −36.42574 | 1.600000 | 1.683810 | 31.2600 |
| ASP: | | | | |
| K: −4.751452 | | | | |
| A: −0.241827E−04 B: 0.973192E−08 C: −0.468341E−10 | | | | |
| D: 0.000000E+00 | | | | |
| 21: | −53.70828 | 12.075074 | | |
| 22: | INFINITY | 3.000000 | 1.516798 | 64.1983 |
| 23: | INFINITY | 0.956897 | | |

Further, in Table 2, the parameter D1 of the first embodiment may represent an air gap between the first lens group 110 and the second lens group 120. The parameter D2 may represent an air gap between the second lens group 120 and the third lens group 130.

TABLE 2

| | Infinity | 400 mm |
|---|---|---|
| D1 | 1.9 | 8.2812 |
| D2 | 16.3548 | 9.9736 |

[Embodiment 2]

Table 3 below may represent a numerical example according to an embodiment (hereinafter, "the second embodiment") different from the previous embodiment, and this table may also represent aspheric coefficients of Equation 1 according to the second embodiment.

Figure 3:
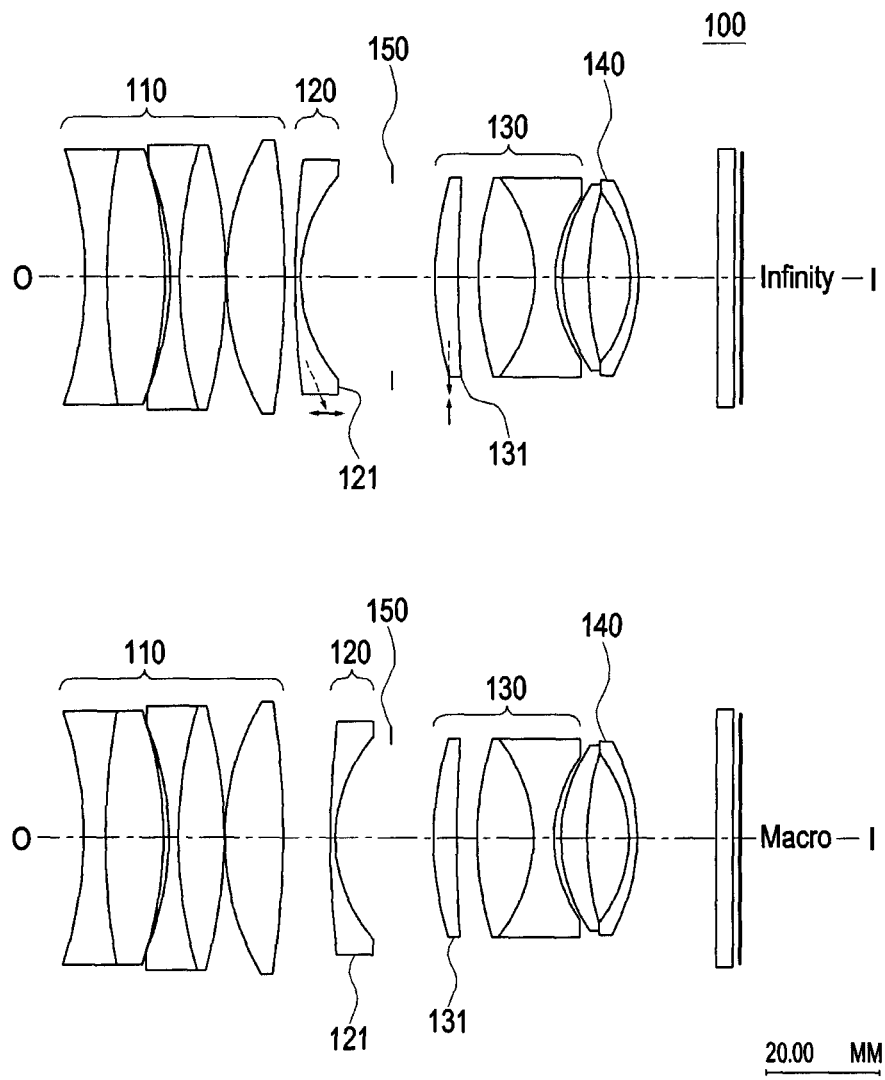
FIG. 3 is a view illustrating a lens arrangement of an image capturing optical system according to an embodiment of the present disclosure.
Figure 4:
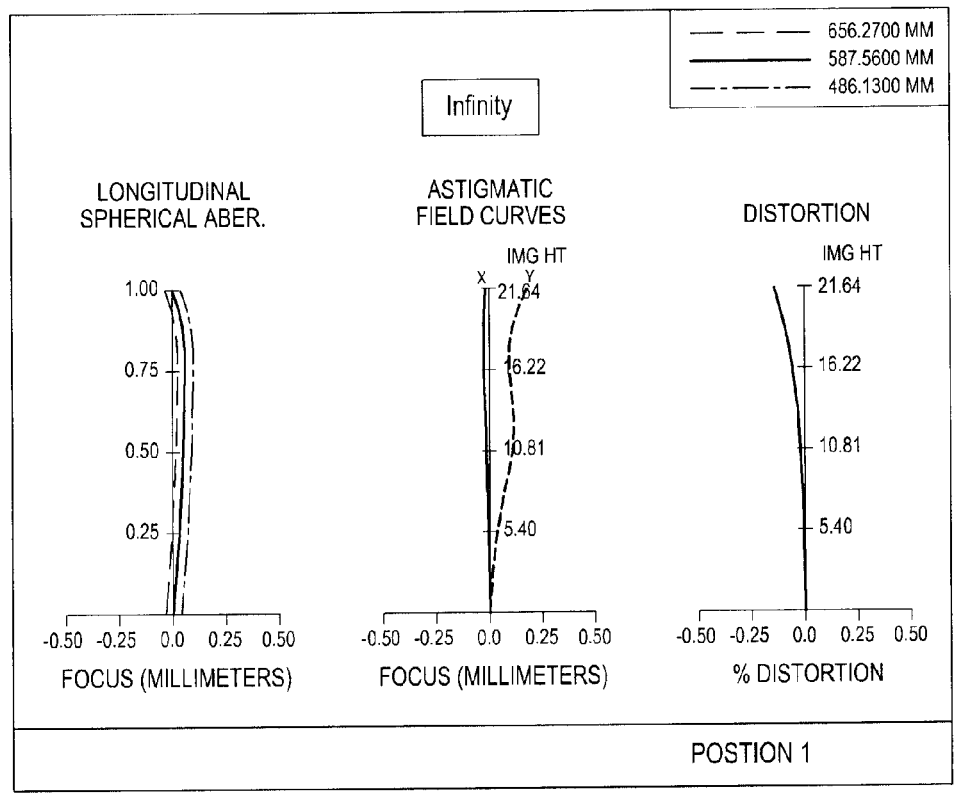
FIG. 4 is a graph illustrating data characteristics of an aberration in the image capturing optical system illustrated in FIG. 3 according to an embodiment of the present disclosure.

Further, FIG. 3 is a view illustrating a lens arrangement of an image capturing optical system according to an embodiment of the present disclosure. FIG. 4 is a graph illustrating data characteristics of an aberration of the image capturing optical system 100 illustrated in FIG. 3.

In the case of the second embodiment, it may be assumed to illustrate that the value of "f" of the overall optical system is 51.53 mm, the value of "Fno" is 1.44, and the value of "2ω" is 48.92.

TABLE 3

| | Refractive Index (RDY) | Thickness (THI, mm) | Refractive Index (Nd) | Abbe Number (Vd) |
|---|---|---|---|---|
| OBJ: | INFINITY | INFINITY | | |
| 1: | −54.38854 | 1.795062 | 1.729160 | 54.6735 |
| 2: | 319.21161 | 12.000000 | 1.834805 | 42.7218 |
| 3: | −46.20697 | 0.300000 | | |
| 4: | −45.76183 | 1.600000 | 1.688930 | 31.1605 |
| 5: | 57.41361 | 8.004215 | 1.804200 | 46.5025 |
| 6: | −184.45654 | 0.300000 | | |
| 7: | 43.01745 | 10.897054 | 1.689460 | 52.6700 |

ASP:
K: 0.753494
A: −0.304280E−05 B: −0.196622E−08 C: −0.557843E−12
D: 0.000000E+00

| 8: | −134.19091 | D1 | | |

ASP:
K: −0.780785
A: 0.102931E−05 B: −0.959793E−09 C: 0.133304E−11
D: 0.000000E+00

| 9: | 203.13095 | 1.000000 | 1.487489 | 70.4412 |
| 10: | 27.37840 | D2 | | |
| STO: | INFINITY | 5.454138 | | |
| 12: | 57.05544 | 4.000000 | 1.689460 | 52.6700 |

ASP:
K: −0.536992
A: −0.435024E−06 B: 0.245124E−08 C: −0.506693E−11
D: 0.000000E+00

| 13: | 218.86274 | 5.101790 | | |
| 14: | 59.00104 | 10.500000 | 1.910822 | 35.2500 |
| 15: | −29.19227 | 4.000000 | 1.728250 | 28.3205 |
| 16: | 27.13825 | 1.406417 | | |
| 17: | 46.25695 | 4.900000 | 1.739860 | 49.0000 |

ASP:
K: −3.711975
A: 0.173418E−04 B: 0.313257E−07 C: −0.305559E−10
D: 0.268514E−12

| 18: | 1000.00000 | 7.635789 | | |

ASP:
K: −1.000000
A: 0.132465E−04 B: 0.363388E−07 C: −0.284101E−10
D: 0.540146E−12

| 19: | −25.03454 | 1.600000 | 1.846663 | 23.7848 |
| 20: | −35.41724 | 11.000000 | | |
| 21: | INFINITY | 3.000000 | 1.516798 | 64.1983 |
| 22: | INFINITY | 0.955618 | | |

Further, in Table 4, D1 of the second embodiment may represent an air gap between the first lens group 110 and the second lens group 120. D2 may represent an air gap between the second lens group 120 and the third lens group 130.

TABLE 4

| | Infinity | 400 mm |
|---|---|---|
| D1 | 1.9860 | 7.9551 |
| D2 | 14.7480 | 8.7789 |

[Embodiment 3]

Table 5 below may represent a numerical example according to another embodiment (hereinafter, "the third embodiment"), and this table may also represent aspheric coefficients of Equation 1 according to the third embodiment.

Figure 5:
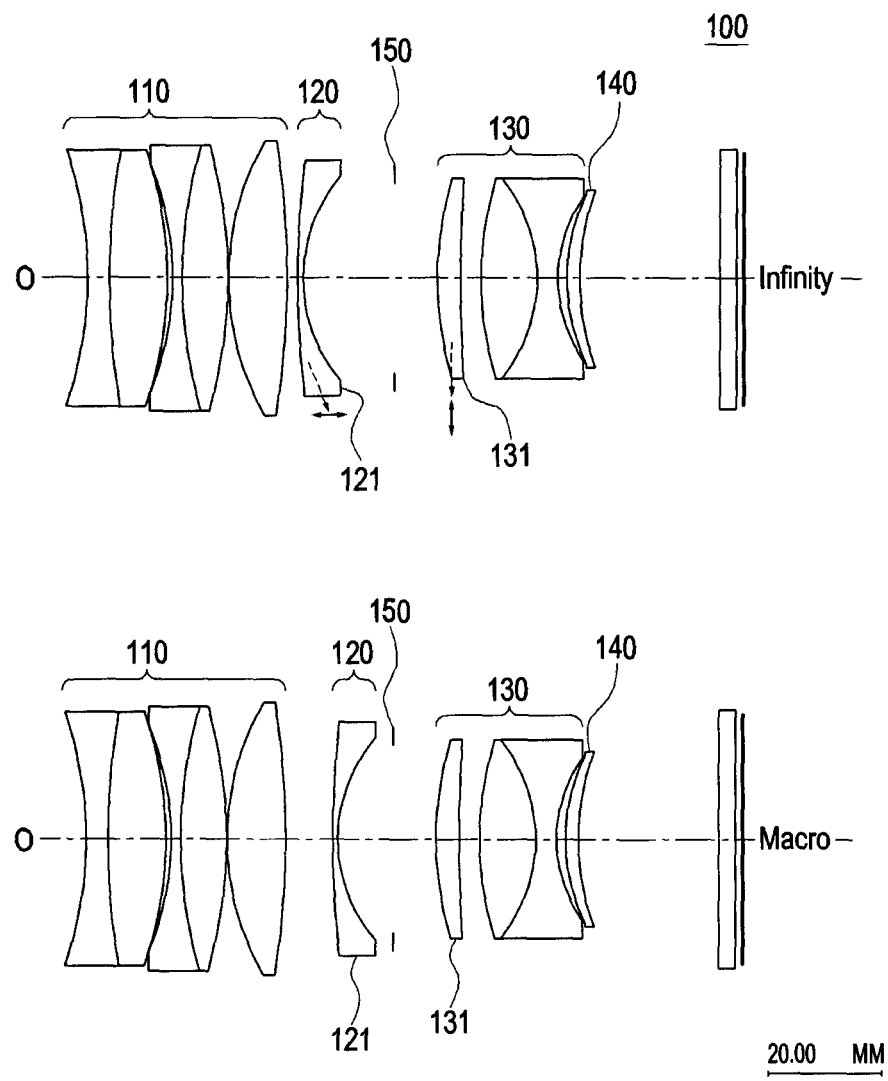
FIG. 5 is a view illustrating a lens arrangement of an image capturing optical system according to an embodiment of the present disclosure.
Figure 6:
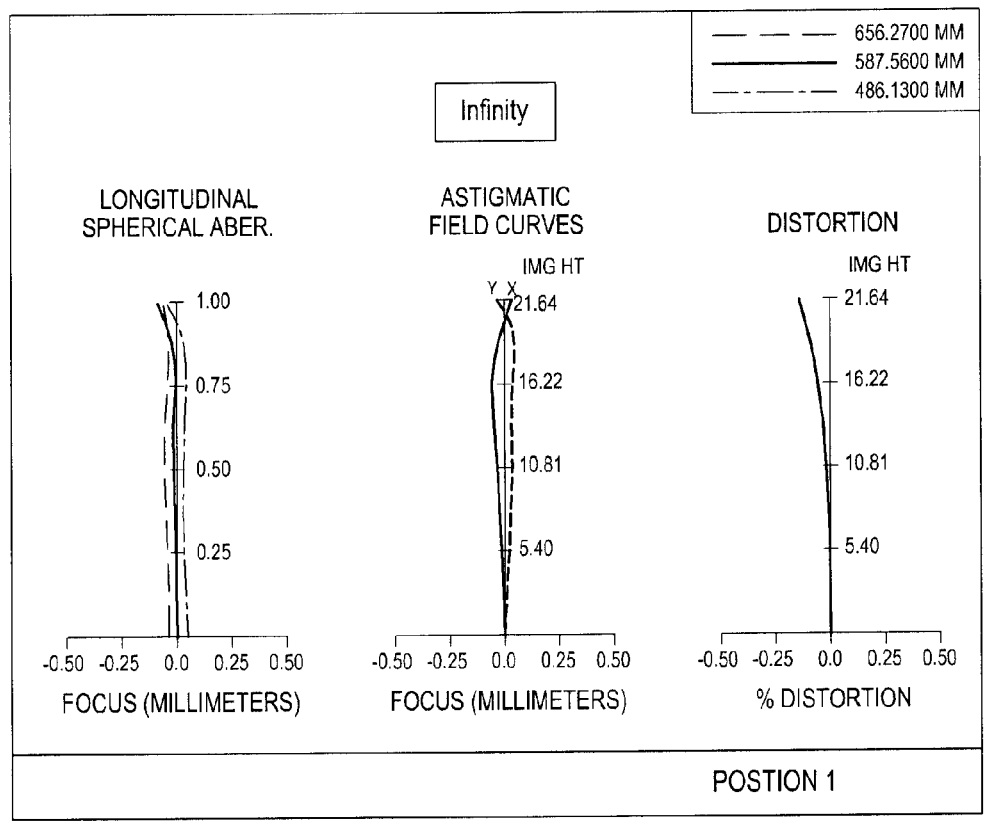
FIG. 6 is a graph view illustrating data characteristics of an aberration of the image capturing optical system illustrated in FIG. 5 according to an embodiment of the present disclosure.

Further, FIG. 5 is a view illustrating a lens arrangement of an image capturing optical system according to an embodiment of the present disclosure. FIG. 6 is graph illustrating data characteristics of an aberration of the image capturing optical system 100 illustrated in FIG. 5.

In the case of the third embodiment, to illustrate operation, it may be assumed that the value "f" of the overall optical system is 50.58 mm, the value "Fno" is 1.44, and the value "2ω" is 47.73.

TABLE 5

| | Refractive Index (RDY) | Thickness (THI, mm) | Refractive Index (Nd) | Abbe Number (Vd) |
|---|---|---|---|---|
| OBJ: | INFINITY | INFINITY | | |
| 1: | −48.01156 | 4.000000 | 1.772500 | 49.6243 |
| 2: | 61.45958 | 12.000000 | 1.881003 | 40.1388 |
| 3: | −40.33802 | 0.200000 | | |
| 4: | −39.96067 | 2.400000 | 1.672700 | 32.1705 |
| 5: | 38.25243 | 8.568046 | 1.804200 | 46.5025 |
| 6: | 455.08622 | 0.100000 | | |
| 7: | 39.36579 | 10.628071 | 1.690120 | 52.8800 |

ASP:
K: −0.156456
A: −0.251874E−05 B: −0.682000E−10 C: −0.128245E−11
D: 0.105232E−14

| 8: | −86.53382 | D1 | | |

ASP:
K: −11.159327
A: 0.123762E−05 B: −0.523642E−09 C: −0.809372E−13
D: 0.676036E−15

| 9: | 107.71040 | 1.000000 | 1.487489 | 70.4412 |
| 10: | 25.49891 | D2 | | |
| STO: | INFINITY | 3.492545 | | |
| 12: | 62.91864 | 3.073123 | 1.690120 | 52.8800 |

ASP:
K: −0.199191
A: −0.769977E−07 B: −0.134013E−08 C: 0.711345E−11
D: −0.133431E−13

| 13: | 157.36470 | 1.300000 | | |
| 14: | 55.89569 | 11.862617 | 1.881003 | 40.1388 |
| 15: | −29.10605 | 3.200000 | 1.698950 | 30.0505 |
| 16: | 27.24083 | 2.319232 | | |
| 17: | 60.73507 | 3.122385 | 1.850270 | 40.4500 |

ASP:
K: 6.082019
A: 0.151856E−04 B: −0.331271E−07 C: 0.142790E−09
D: −0.821885E−12

| 18: | 135.88630 | 23.783462 | | |

ASP:
K: −1.000000
A: 0.208140E−04 B: −0.205747E−07 C: 0.102580E−09
D: −0.722301E−12

| 19: | INFINITY | 3.000000 | 1.516798 | 64.1983 |
| 20: | INFINITY | 1.036987 | | |

Further, in Table 6, the parameter D1 of the third embodiment may represent an air gap between the first lens group 110 and the second lens group 120. The distance parameter D2 may represent an air gap between the second lens group 120 and the third lens group 130.

TABLE 6

| | Infinity | 400 mm |
|---|---|---|
| D1 | 1.9860 | 7.9551 |
| D2 | 14.7480 | 8.7789 |

The values of the conditional expressions for the first to third embodiments are illustrated in Table 7 below.

TABLE 7

| | Embodiment 1 | Embodiment 2 | Embodiment 3 |
|---|---|---|---|
| Expression (1) | 0.9 | 0.92 | 0.89 |
| Expression (2) | 1.487489 | 1.487489 | 1.487489 |
| Expression (3) | −1.2735 | −1.26 | −1.36 |

Hereinafter, electronic devices are described with reference to the accompanying drawings, according to one or more embodiments of the present disclosure. As used herein, the term "user" may denote a human or another device (e.g., an artificial intelligent electronic device) using the electronic device.

Figure 7:
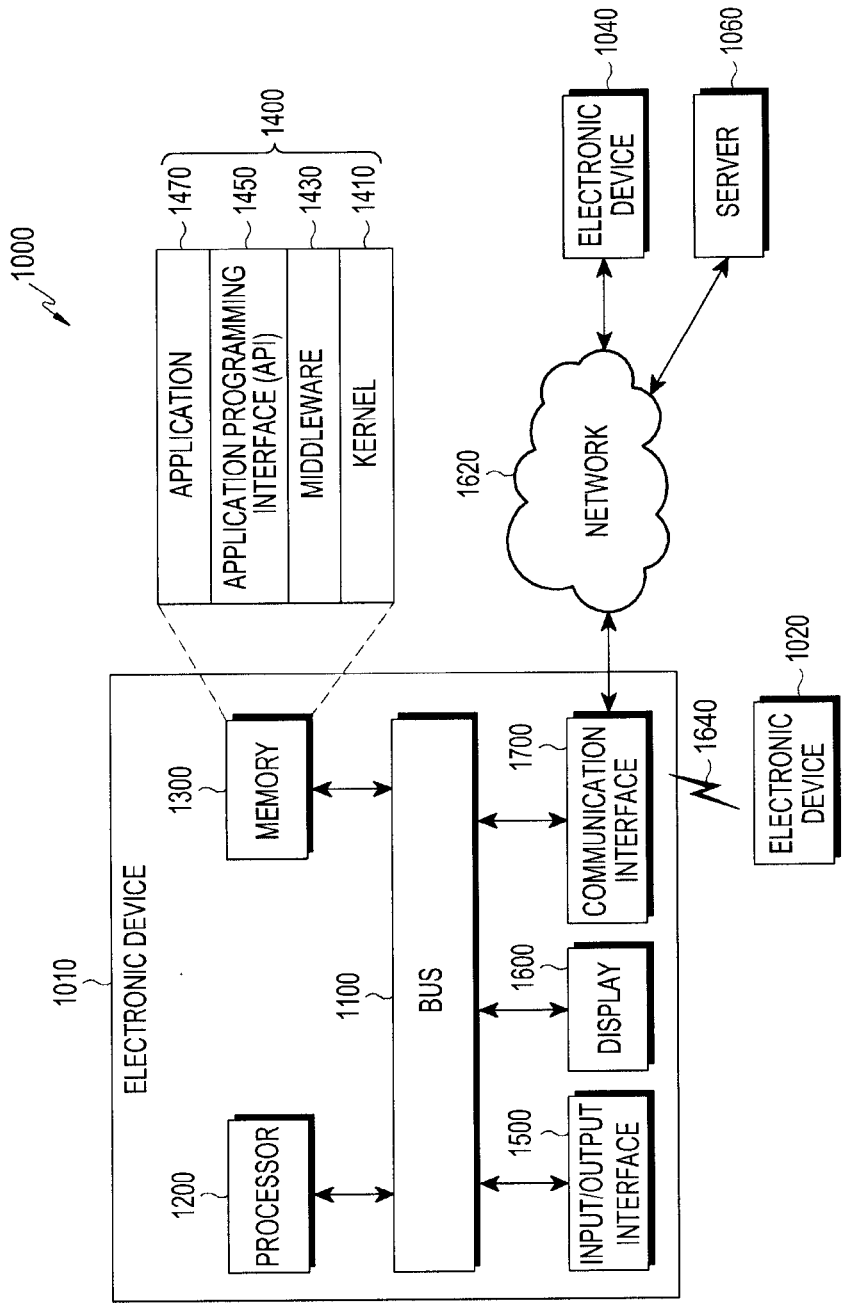
FIG. 7 is a diagram illustrating network environment including an electronic device according to an embodiment of the present disclosure.

Referring to FIG. 7, according to an embodiment of the present disclosure, an electronic device 1010 is included in a network environment 1000. The electronic device 1010 may include a bus 1100, a processor 1200, a memory 1300, an input/output interface 1500, a display 1600, and a communication interface 1700. In some embodiments, the electronic device 1010 may exclude at least one of the components or may include additional components.

The bus 1100 may include a circuit for connecting the components 1200, 1300, 1500 to 1700 with one another and transferring communications (e.g., control messages and/or data) between the components.

The processor 1200 may include one or more of a central processing unit (CPU), an application processor (AP), or a communication processor (CP). The processor 1200 may perform control on at least one of the other components of the electronic device 1010, and/or perform an operation or data processing relating to communication. The processor 1200 may include a controller, include the controller as a part thereof, or may be configured as the controller.

The memory 1300 may include any means for storing data for later retrieval such as a volatile and/or non-volatile memory. For example, the memory 1300 may store commands or data related to at least one other component of the electronic device 1010. According to an embodiment of the present disclosure, the memory 1300 may store software and/or a program 1400. The program 1400 may include, e.g., a kernel 1410, middleware 1430, an application programming interface (API) 1450, and/or an application program (or "application") 1470. At least a portion of the kernel 1410, middleware 1430, or API 1450 may be part of or associated with an operating system (OS).

For example, the kernel 1410 may control or manage system resources (e.g., the bus 1100, processor 1200, or a memory 1300) used to perform operations or functions implemented in other programs (e.g., the middleware 1430, API 1450, or application program 1470). The kernel 1410 may provide an interface that allows the middleware 1430, the API 1450, or the application 1470 to access the individual components of the electronic device 1010 to control or manage the system resources.

The middleware 1430 may function as a relay to allow the API 1450 or the application 1470 to communicate data with the kernel 1410, for example.

Further, the middleware 1430 may process one or more task requests received from the application program 1470 in order of priority. For example, the middleware 1430 may assign at least one of application programs 1470 with priority of using system resources (e.g., the bus 1100, processor 1200, or memory 1300) of at least one electronic device 1010. For example, the middleware 1430 may perform scheduling or load balancing on the one or more task requests by processing the one or more task requests according to the priority assigned to the at least one application program 1470.

The API 1450 may provide an interface allowing the application 1470 to control functions provided from the kernel 1410 or the middleware 1430. For example, the API 1450 may include at least one interface or function (e.g., a command) for filing control, window control, image processing or text control.

The input/output interface 1500 may serve as an interface that may, e.g., transfer commands or data input from a user or other external devices to other component(s) of the electronic device 1010. Further, the input/output interface 1500 may output commands or data received from other component(s) of the electronic device 1010 to the user or the other external device.

The display 1600 may include any means of display and may include, e.g., a liquid crystal display (LCD), a light emitting diode (LED) display, an organic light emitting diode (OLED) display, or a microelectromechanical systems (MEMS) display, or an electronic paper display. The display 1600 may display, e.g., various contents (e.g., text, images, videos, icons, or symbols) to the user. The display 1600 may include a touchscreen and may receive, e.g., a touch, gesture, proximity or hovering input using an electronic pen or a body portion of the user.

The communication interface 1700 may be configured to provide communication between the electronic device 1010 and an external electronic device (e.g., a first electronic device 1020, a second electronic device 1040, or a server 1060). For example, the communication interface 1700 may be connected with the network 1620 through wireless or wired communication to communicate with the external electronic device (e.g., a first external electronic device 1040 or a server 1060). The communication interface 1700 may include a communication processor (CP). The communication processor may configure one of a plurality of modules configuring the communication interface 1700. According to an embodiment of the present disclosure, the communication processor may be included in the processor 1200.

The wireless communication may be a cellular communication protocol and may use at least one of, e.g., long-term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). Further, the wireless communication may include, e.g., short-range communication 1640. The short-range communication 1640 may include at least one of wireless fidelity (Wi-Fi), Bluetooth, near-field communication (NFC), or global navigation satellite system (GNSS). The GNSS may include at least one of, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, or plain old telephone service (POTS). The network 1620 may include at least one of communication networks, e.g., a computer network (e.g., local area network (LAN) or wide area network (WAN)), Internet, or a telephone network.

The first and second external electronic devices 1020 and 1040 each may be a device of the same or a different type from the electronic device 1010. According to an embodiment of the present disclosure, the server 106 may include a group of one or more servers. According to an embodiment of the present disclosure, all or some of operations executed on the electronic device 1010 may be executed on another or multiple other electronic devices (e.g., the electronic devices 1020 and 1040 or server 1060). According to an embodiment of the present disclosure, when the electronic device 1010 is to perform some function or service automatically or at a request, the electronic device 1010, instead of executing the function or service on its own or additionally, may request another device (e.g., electronic devices 1020 and 1040 or server 1060) to perform at least some functions associated therewith. The other electronic device (e.g., electronic devices 1020 and 1040 or server 1060) may execute the requested functions or additional functions and transfer a result of the execution to the electronic device 1010. The electronic device 1010 may provide a requested function or service by processing the received result as it is or additionally. To that end, a cloud computing, distributed computing, or client-server computing technique may be used, for example.

Figure 8:
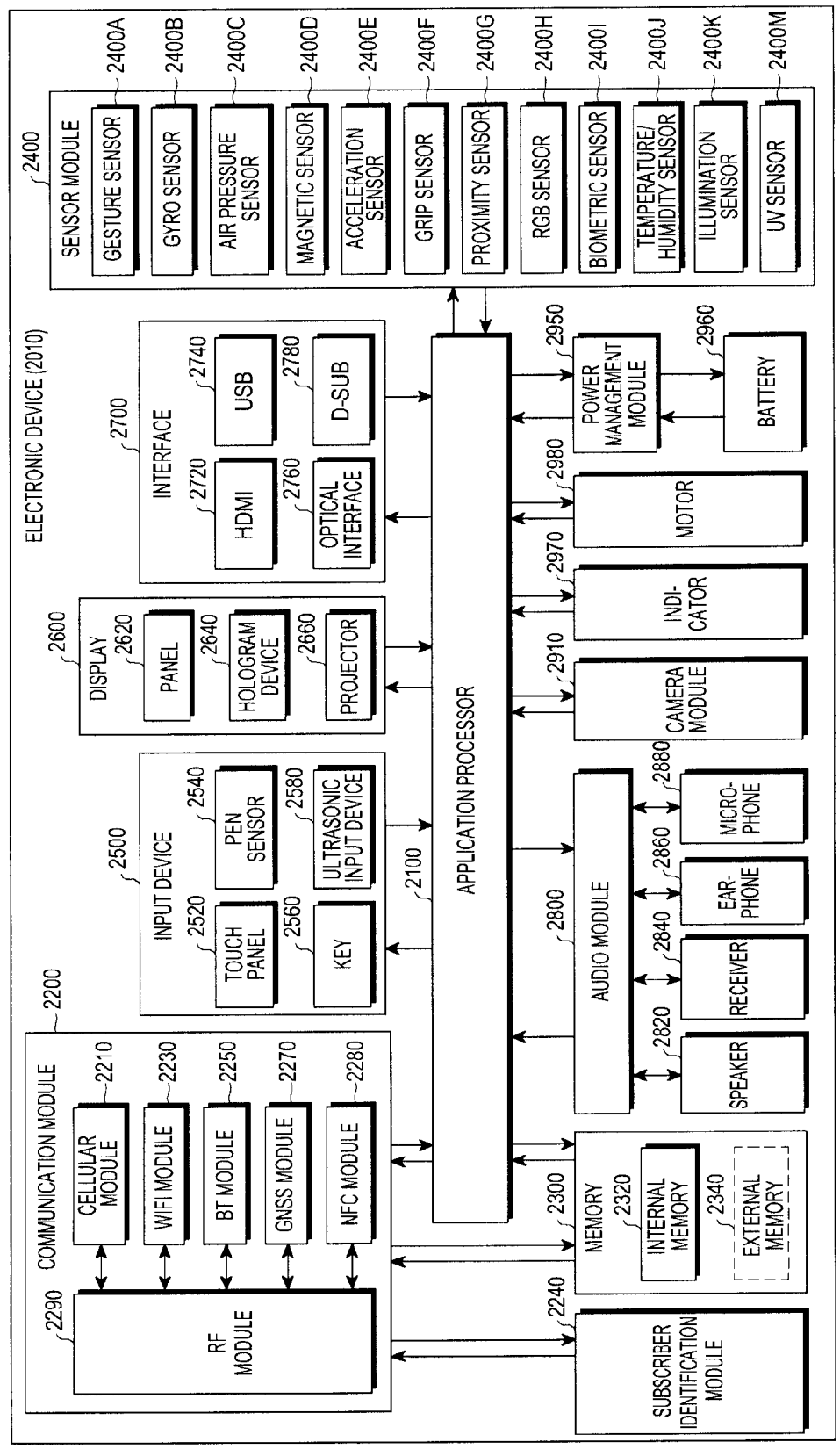
FIG. 8 is a block diagram illustrating an electronic device according to an embodiment of the present disclosure.

FIG. 8 is a block diagram illustrating an electronic device 2010 according to an embodiment of the present disclosure. The electronic device 2010 may include the whole or part of the configuration of, e.g., the electronic device 1010 shown in FIG. 1. The electronic device 2010 may include one or more processors (e.g., application processors (APs)) 2100, a communication module 2200, a subscriber identification module (SIM) 2240, a memory 2300, a sensor module 2400, an input device 2500, a display 2600, an interface 2700, an audio module 2800, a camera module 2910, a power management module 2950, a battery 2960, an indicator 2970, and a motor 2980.

The processor 2100 may control multiple hardware and software components connected to the processor 2100 by executing or running, e.g., an operating system or application programs, and the processor 2100 may process and compute various data. The processor 2100 may be implemented in, e.g., a system on chip (SoC). According to an embodiment of the present disclosure, the processor 2100 may further include a graphic processing unit (GPU) and/or an image signal processor. The processor 2100 may include at least some (e.g., the cellular module 2210) of the components shown in FIG. 7. The processor 2100 may load a command or data received from at least one of other components (e.g., a non-volatile memory) on a volatile memory, process the command or data, and store various data in the non-volatile memory.

The communication module 2200 may have the same or similar configuration to the communication interface 1700 of FIG. 7. The communication module 2200 may include, e.g., a cellular module 2210, a Wi-Fi module 2230, a Bluetooth module 2250, a GNSS module 2270 (e.g., a GPS module, a Glonass module, a Beidou module, or a Galileo module), an NFC module 2280, and a radio frequency (RF) module 2290.

The cellular module 2210 may provide voice call, video call, text, or Internet services through, e.g., a communication network. The cellular module 2210 may perform identification or authentication on the electronic device 2010 in the communication network using a subscriber identification module 2240 (e.g., the SIM card). According to an embodiment of the present disclosure, the cellular module 2210 may perform at least some of the functions provided by the processor 2100. According to an embodiment of the present disclosure, the cellular module 2210 may include a communication processor (CP).

The Wi-Fi module 2230, the Bluetooth module 2250, the GNSS module 2270, or the NFC module 2280 may include a processor for, e.g., processing data communicated through the module. According to an embodiment of the present disclosure, at least some (e.g., two or more) of the cellular module 2210, the Wi-Fi module 2230, the Bluetooth module 2250, the GNSS module 2270, or the NFC module 2280 may be included in a single integrated circuit (IC) or an IC package.

The RF module 2290 may communicate data, e.g., communication signals (e.g., RF signals). The RF module 2290 may include, e.g., a transceiver, a power amplifier module (PAM), a frequency filter, a low noise amplifier (LNA), or an antenna. According to an embodiment of the present disclosure, at least one of the cellular module 2210, the Wi-Fi module 2230, the Bluetooth module 2250, the GNSS module 2270, or the NFC module 2280 may communicate RF signals through a separate RF module.

The subscription identification module 2240 may include, e.g., a card including a subscriber identification module and/or an embedded SIM, and may contain unique identification information (e.g., an integrated circuit card identifier (ICCID) or subscriber information (e.g., an international mobile subscriber identity (IMSI)).

The memory 2300 (e.g., the memory 1300 of FIG. 7) may include, e.g., an internal memory 2320 or an external memory 2340. The internal memory 2320 may include at least one of, e.g., a volatile memory (e.g., a dynamic random access memory (DRAM), a static RAM (SRAM), a synchronous dynamic RAM (SDRAM), etc.) or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD).

The external memory 2340 may include a flash drive, e.g., a compact flash (CF) memory, a secure digital (SD) memory, a micro-SD memory, a min-SD memory, an extreme digital (xD) memory, a multi-media card (MMC), or a memory stick™. The external memory 2340 may be functionally and/or physically connected with the electronic device 2010 via various interfaces.

The sensor module 2400 may measure a physical quantity or detect a motion state of the electronic device 2010, and the sensor module 2400 may convert the measured or detected information into an electrical signal. The sensor module 2400 may include at least one of, e.g., a gesture sensor 2400A, a gyro sensor 2400B, an atmospheric pressure sensor 2400C, a magnetic sensor 2400D, an acceleration sensor 2400E, a grip sensor 2400F, a proximity sensor 2400G, a color sensor 2400H (e.g., a red-green-blue (RGB) sensor, a bio sensor 2400I, a temperature/humidity sensor 2400J, an illumination sensor 2400K, or an Ultra Violet (UV) sensor 2400M. Additionally, or alternatively, the sensor module 2400 may include, e.g., an E-nose sensor, an electromyography (EMG) sensor, an electroencephalogram (EEG) sensor, an electrocardiogram (ECG) sensor, an infrared (IR) sensor, an iris sensor, or a finger print sensor. The sensor module 2400 may further include a control circuit for controlling at least one or more of the sensors included in the sensing module. According to an embodiment of the present disclosure, the electronic device 2010 may further include a processor configured to control the sensor module 2400 as part of the processor 2100 or separately from the processor 2100, and the electronic device 2010 may control the sensor module 2400 while the processor 2100 is in a sleep mode.

The input device or unit 2500 may include, e.g., a touch panel 2520, a (digital) pen sensor 2540, a key 2560, or an ultrasonic input device 2580. The touch panel 2520 may use at least one of capacitive, resistive, infrared, or ultrasonic methods. The touch panel 2520 may further include a control circuit. The touch panel 2520 may further include a tactile layer and may provide a user with a tactile reaction.

The (digital) pen sensor 2540 may include, e.g., a part of a touch panel or a separate sheet for recognition. The key 2560 may include e.g., a physical button, optical key or key pad. The ultrasonic input device 2580 may sense an ultrasonic wave generated from an input tool through a microphone (e.g., the microphone 2880) to identify data corresponding to the sensed ultrasonic wave.

The display 2600 (e.g., the display 1600 of FIG. 7) may include a panel 2620, a hologram device 2640, or a projector 2660. The panel 2620 may have the same or similar configuration to the display 1600 of FIG. 7. The panel 2620 may be implemented to be flexible, transparent, or wearable. The panel 2620 may also be incorporated with the touch panel 2520 in a module. The hologram device 2640 may make three dimensional (3D) images (holograms) in the air by using light interference. The projector 2660 may display an image by projecting light onto a screen. The screen may be, for example, located inside or outside of the electronic device 2010. In accordance with an embodiment, the display 2600 may further include a control circuit to control the panel 2620, the hologram device 2640, or the projector 2660.

The interface 2700 may include e.g., a High Definition Multimedia Interface (HDMI) 2720, a USB 2740, an optical interface 2760, or a D-subminiature (D-sub) 2780. The interface 2700 may be included in e.g., the communication interface 1700 shown in FIG. 7. Additionally, or alternatively, the interface 2700 may include a Mobile High-definition Link (MHL) interface, a secure digital (SD) card/multimedia card (MMC) interface, or infrared data association (IrDA) standard interface.

The audio module 2800 may convert a sound into an electric signal or vice versa, for example. At least a part of the audio module 2800 may be included in e.g., the input/output interface 1500 as shown in FIG. 7. The audio module 2800 may process sound information input or output through e.g., a speaker 2820, a receiver 2840, an earphone 2860, or a microphone 2880.

The camera module 2910 may be a device for recording still images and videos, and may include, according to an embodiment of the present disclosure, one or more image sensors (e.g., front and back sensors), a lens, an Image signal processor (ISP), or a flash such as an LED or xenon lamp.

The power management module 2950 may manage power of the electronic device 2010, for example. According to an embodiment of the present disclosure, the power management module 2950 may include a circuit for charging the battery 2960. Although not shown, according to an embodiment of the present disclosure, the power manager module 2950 may include a power management Integrated circuit (PMIC), a charger IC, or a battery or fuel gauge. The PMIC may include a wired and/or wireless recharging means of charging. The wireless charging means may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 2960, a voltage, a current, or a temperature while the battery 2960 is being charged. The battery 2960 may include, e.g., a rechargeable battery or a solar battery.

The indicator 2970 may indicate a particular state of the electronic device 2010 or a part (e.g., the processor 2100) of the electronic device, including e.g., a booting state, a message state, or recharging state. The motor 2980 may convert an electric signal to a mechanical vibration and may generate a vibrational or haptic effect. Although not shown, a processing unit for supporting mobile TV, such as a GPU may be included in the electronic device 2010. The processing unit for supporting mobile TV may process media data conforming to a standard for digital multimedia broadcasting (DMB), digital video broadcasting (DVB), or mediaFlo™.

Each of the aforementioned components of the electronic device may include one or more components, and a name of the component may depend on the type of electronic device. The electronic device in accordance with one or more embodiments of the present disclosure may include at least one of the aforementioned components, omit some of them, or include other additional component(s). Some of the components may be combined into an entity, but the entity may perform the same functions as the components may do.

Figure 9:
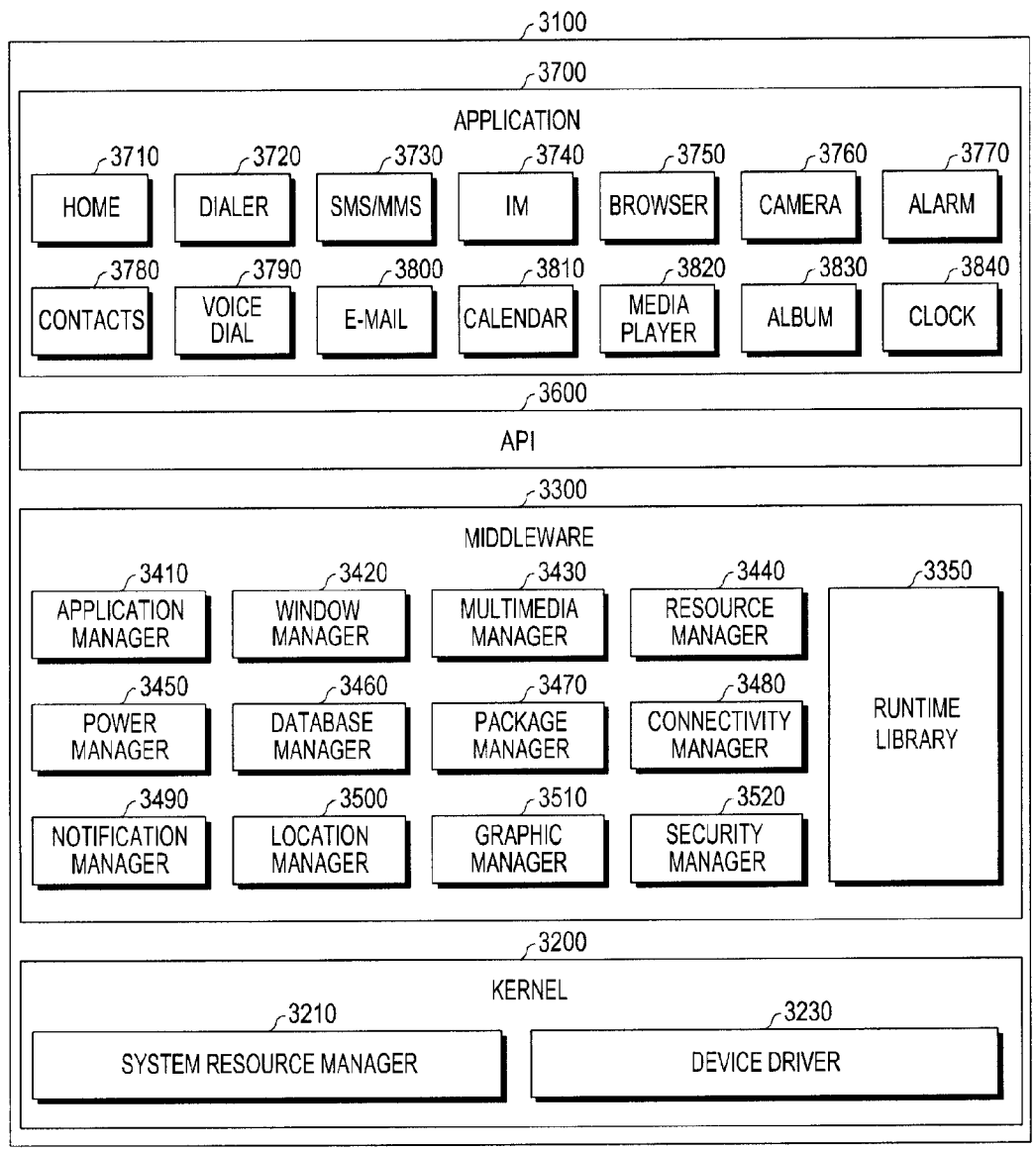
FIG. 9 is a block diagram illustrating a program module according to an embodiment of the present disclosure.

FIG. 9 is a block diagram illustrating a program module according to an embodiment of the present disclosure. According to an embodiment of the present disclosure, the program module 3100 (e.g., the program 1400 of FIG. 7) may include an operating system (OS) controlling resources related to the electronic device (e.g., the electronic device 1010 of FIG. 7) and/or various applications (e.g., the application processor 1470) driven on the operating system. The operating system may include, e.g., Android, iOS, Windows, Symbian, Tizen, or Bada.

The program 3100 may include, e.g., a kernel 3200, middleware 3300, an application programming interface (API) 3600, and/or an application 3700. At least a part of the program module 3100 may be preloaded on the electronic device or may be downloaded from an external electronic device (e.g., the electronic devices 1020 and 1040 or server 1060 of FIG. 7).

The kernel 3200 (e.g., the kernel 1410 of FIG. 7) may include, e.g., a system resource manager 3210 and/or a device driver 3230. The system resource manager 3210 may perform control, the kernel 3200 (e.g., the kernel 1410) may include, e.g., a system resource manager 3210 and/or a device driver 3230. The system resource manager 3210 may perform control, allocation, or recovery of system resources. According to an embodiment of the present disclosure, the system resource manager 3210 may include a process managing unit, a memory managing unit, or a file system managing unit. The device driver 3230 may include, e.g., a display driver, a camera driver, a Bluetooth driver, a shared memory driver, a USB driver, a keypad driver, a Wi-Fi driver, an audio driver, or an inter-process communication (IPC) driver.

The middleware 3300 may provide one or more functions to the application 3700 through the API 3600 so that the application 3700 may efficiently use limited system resources in the electronic device or provide functions jointly required by applications 3700. According to an embodiment of the present disclosure, the middleware 3300 (e.g., the middleware 1430) The middleware 3300 may provide one or more functions to the application 3700 through the API 3600 so that the application 3700 may efficiently use limited system resources in the electronic device or provide functions jointly required by applications 3700. According to an embodiment of the present disclosure, the middleware 3300 (e.g., the middleware 1430) may include at least one of a runtime library 3350, an application manager 3410, a window manager 3420, a multimedia manager 3430, a resource manager 3440, a power manager 3450, a database manager 3460, a package manager 3470, a connectivity manager 3480, a notification manager 3490, a location manager 3500, a graphic manager 3510, or a security manager 3520.

The runtime library 3350 may include a library module used by a compiler in order to add a new function through a programming language while, e.g., the application 3700 is being executed. The runtime library 3350 may perform input/output management, memory management, or operation on arithmetic functions.

The application manager 3410 may manage the life cycle of at least one application of, e.g., the applications 3700. The window manager 3420 may manage GUI resources used on the screen. The multimedia manager 3430 may grasp formats necessary to play various media files and use a codec appropriate for a format to perform encoding or decoding on media files. The resource manager 3440 may manage resources, such as source code of at least one of the applications 3700, memory or storage space.

The power manager 3450 may operate together with, e.g., a basic input/output system (BIOS) to manage battery or power and provide power information necessary for operating the electronic device. The database manager 3460 may generate, search, or vary a database to be used in at least one of the applications 3700. The package manager 3470 may manage installation or update of an application that is distributed in the form of a package file.

The connectivity manager 3480 may manage wireless connectivity, such as, e.g., Wi-Fi or Bluetooth. The notification manager 3490 may display or notify an event, such as a coming message, appointment, or proximity notification, of the user without interfering with the user. The location manager 3500 may manage locational information on the electronic device. The graphic manager 3510 may manage graphic effects to be offered to the user and their related user interface. The security manager 3520 may provide various security functions necessary for system security or user authentication. According to an embodiment of the present disclosure, when the electronic device (e.g., the electronic device 1010) has telephony capability, the middleware 3300 may further include a telephony manager for managing voice call or video call functions of the electronic device.

The middleware 3330 may include a middleware module forming a combination of various functions of the above-described components. The middleware 3330 may provide a specified module per type of the operating system in order to provide a differentiated function. Further, the middleware 3330 may dynamically omit some existing components or add new components.

The API 3600 (e.g., the API 1450 of FIG. 7) may be a set of, e.g., API programming functions and may have different configurations depending on operating systems. For example, in the case of Android or iOS, one API set may be provided per platform, and in the case of Tizen, two or more API sets may be offered per platform.

The application 3700 (e.g., the application processor 1470 of FIG. 7) may include one or more applications that may provide functions such as, e.g., a home 3710, a dialer 3720, a short message service (SMS)/multimedia messaging service (MMS) 3730, an instant message (IM) 3740, a browser 3750, a camera 3760, an alarm 3770, a contact 3780, a voice dial 3790, an email 3800, a calendar 3810, a media player 3820, an album 3830, or a clock 3840, a health-care (e.g., measuring the degree of workout or blood sugar), or provision of environmental information (e.g., provision of air pressure, moisture, or temperature information).

According to an embodiment of the present disclosure, the application 3700 may include an application (hereinafter, "information exchanging application" for convenience) supporting information exchange between the electronic device (e.g., the electronic device 1010) and an external electronic device (e.g., the electronic devices 1020 and 1040). Examples of the information exchange application may include, but is not limited to, a notification relay application for transferring specific information to the external electronic device, or a device management application for managing the external electronic device.

For example, the notification relay application may include a function for relaying notification information generated from other applications of the electronic device (e.g., the SMS/MMS application, email application, health-care application, or environmental information application) to the external electronic device (e.g., the electronic devices 1020 and 1040). Further, the notification relay application may receive notification information from, e.g., the external electronic device and may provide the received notification information to the user.

The device management application may perform at least some functions of the external electronic device (e.g., the electronic device 1020 or 1040) communicating with the electronic device (for example, turning on/off the external electronic device (or some components of the external electronic device) or control of brightness (or resolution) of the display), and the device management application may manage (e.g., install, delete, or update) an application operating in the external electronic device or a function (e.g., calling function or messaging function) provided from the external electronic device.

According to an embodiment of the present disclosure, the application 3700 may include an application (e.g., a health-care application of a mobile medical device) designated according to an attribute of the external electronic device (e.g., the electronic devices 1020 and 1040). According to an embodiment of the present disclosure, the application 3700 may include an application received from the external electronic device (e.g., the server 1060 or electronic devices 1020 and 1040). According to an embodiment of the present disclosure, the application 370 may include a pre-loaded application or a third party application downloadable from a server. The names of the components of the program module 3100 according to the shown embodiment may be varied depending on the type of operating system.

According to an embodiment of the present disclosure, at least a part of the program module 3100 may be implemented in software, firmware, hardware, or in a combination of two or more thereof. At least a part of the programming module 3100 may be implemented (e.g., executed) by e.g., a processor (e.g., the processor 2100). At least a part of the program module 3100 may include e.g., a module, program, routine, set of instructions, process, or the like for performing one or more functions.

As is apparent from the foregoing description, according to embodiments of the present disclosure, the image capturing optical system may provide for a reduction in the size of an actuator and improved speed in focusing functions while reducing or mitigating image imbalance by having a Fno 1.4 diameter and including one focus adjusting lens and one camera shake correction lens.

Further, according to an embodiment of the present disclosure, the image capturing optical system may allow for a minimized size of the overall optical system, reduced volume and weight of lens, manufacturing cost savings, as well as enhanced aberration correction efficiency and effective correction of chromatic aberration.

Further, according to an embodiment of the present disclosure, the image capturing optical system may minimize variations in the spherical aberration and astigmatism using one aspherical lens in the third lens group, even though the lens moves in a direction perpendicular to an optical axis for camera shake adjustment, and the image capturing optical system may thus secure a performance upon correcting camera shake.

Further, according to an embodiment of the present disclosure, the image capturing optical system may include one or more doublet lenses in the fourth lens group to facilitate the correction of the axial chromatic aberration and chromatic aberration of magnification. The image capturing optical system may include at least one or more aspherical lenses in the fourth lens group to facilitate the correction of the astigmatism and curvature of field of the overall optical system.

The embodiments disclosed herein are proposed for description and understanding of the disclosed technology and does not limit the scope of the present disclosure. Accordingly, the scope of the present disclosure should be interpreted as including all changes or various embodiments based on the technical spirit of the present disclosure.

What is claimed is:

1. An image capturing optical system, comprising:
a first lens group having a positive refractive power and disposed along an optical axis and to face an object whose image is to be captured, the first lens group including a first doublet lens, a second doublet lens and a positive convex aspherical lens disposed sequentially from the object, wherein a lens of the second doublet lens closest to the object has an object-side surface that is concave towards the object;
a second lens group having a negative refractive power and disposed along the optical axis and adjacent to the first lens group, and wherein the second lens group includes a focus correction lens to correct a difference in a focused position according to a variation in a position of the object;
a third lens group having a positive refractive power and disposed along the optical axis; and
a subsequent lens group adjacent the third lens group and disposed along the optical axis and to face an image of the object, wherein a lens group subsequent to the second lens group includes a camera shake correction lens to move in a direction perpendicular to the optical axis to correct an image imbalance due to an external vibration.

2. The image capturing optical system of claim 1, wherein characteristics of the optical system satisfy equation $0.7 \leq f1/f \leq 1.2$ wherein, "f1" represents a lens focal length of the first lens group, and "f" represents a focal length of the optical system.

3. The image capturing optical system of claim 1, wherein a lens provided in the second lens group satisfies an equation $1.4 \leq N2 \leq 1.6$ wherein, "N2" represents a d-line refractive index of the lens of the second lens group.

4. The image capturing optical system of claim 1, wherein the first doublet lens has a lens surface convex towards an image sensor of the optical system.

5. The image capturing optical system of claim 1, wherein a lens disposed farthest away from the object in the first lens group is configured as an aspherical lens.

6. The image capturing optical system of claim 1, wherein lenses arranged in the second lens group include a meniscus lens convex to face the object.

7. The image capturing optical system of claim 1, wherein characteristics of the optical system satisfy an equation $1.5 \leq f2/f \leq 1.0$ wherein "f2" represents a focal length of a lens of the second lens group, and "f" represents a focal length of the optical system.

8. The image capturing optical system of claim 1, wherein lenses arranged in the third lens group include a meniscus aspheric lens convex to face the object.

9. The image capturing optical system of claim 1, wherein the subsequent group to the third lens group includes at least one or more doublet lenses.

10. The image capturing optical system of claim 1, wherein the subsequent group to the third lens group includes at least one or more meniscus aspheric lenses.

* * * * *